United States Patent

Patsch et al.

[11] Patent Number: 5,194,607
[45] Date of Patent: Mar. 16, 1993

[54] REACTIVE DYES WITH A TRIPHENDIOXAZINE CHROMOPHORE

[75] Inventors: Manfred Patsch, Wachenheim; Claus Marschner, Speyer; Claus-Ulrich Priester, Ludwigshafen, all of Fed. Rep. of Germany

[73] Assignee: BASF Aktiengesellschaft, Ludwigshafen, Fed. Rep. of Germany

[21] Appl. No.: 722,108

[22] Filed: Jun. 27, 1991

[30] Foreign Application Priority Data

Jun. 27, 1990 [DE] Fed. Rep. of Germany ....... 4020422

[51] Int. Cl.$^5$ .................. C07D 285/34; C07D 273/04; C07D 498/02
[52] U.S. Cl. .......................................... 544/8; 544/67; 544/76
[58] Field of Search ................. 544/8, 67, 76

[56] References Cited

U.S. PATENT DOCUMENTS

| | | | |
|---|---|---|---|
| 3,996,211 | 12/1976 | Leng et al. | 260/246 R |
| 4,532,323 | 7/1985 | Jager | 544/75 |
| 4,845,213 | 7/1989 | Stawitz et al. | 544/76 |
| 4,923,988 | 5/1990 | Nahr et al. | 544/74 |

FOREIGN PATENT DOCUMENTS

| | | |
|---|---|---|
| 0199056 | 10/1986 | European Pat. Off. |
| 0296411 | 12/1988 | European Pat. Off. |
| 0311969 | 4/1989 | European Pat. Off. |
| 0400429 | 12/1990 | European Pat. Off. |
| 2503611 | 8/1975 | Fed. Rep. of Germany |
| 1589915 | 5/1981 | United Kingdom |

*Primary Examiner*—John M. Ford
*Attorney, Agent, or Firm*—Oblon, Spivak, McClelland, Maier & Neustadt

[57] ABSTRACT

Triphendioxazine dyes suitable for dyeing or printing hydroxyl- or amido-containing substrates have the formula

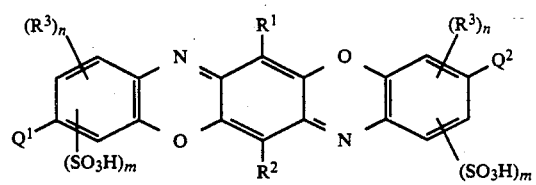

where
n is 0 or 1,
m is 1 or 2,
$R^1$ and $R^2$ are each independently of the other hydrogen, chlorine, bromine, hydroxysulfonyl, $C_1$–$C_4$-alkyl, $C_1$–$C_4$-alkoxy, substituted or unsubstituted phenyl or substituted or unsubstituted phenoxy,
$R^3$ is halogen, carboxyl, $C_1$–$C_4$-alkyl, $C_1$–$C_4$-alkoxy, vinylsulfonyl or the radical $-SO_2-CH_2CH_2-Z$, where Z is a leaving group, and
$Q^1$ and $Q^2$ are each independently of the other a radical of the formula

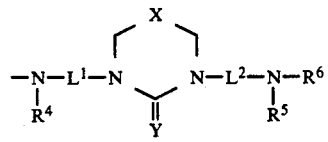

where
$R^4$ and $R^5$ are each independently of the other hydrogen, $C_1$–$C_4$-alkyl or phenyl,
$R^6$ is hydrogen or a fiber-reactive radical,
$L^1$ and $L^2$ are each independently of the other substituted or unsubstituted $C_2$–$C_8$-alkylene or phenylene,
X is a chemical bond, oxygen, sulfur, imino, $C_1$–$C_4$-alkylimino, carbonyl or methylene, and
Y is oxygen or sulfur, with the proviso that if n is 0, $R^6$ is a fiber-reactive radical, and that the hydroxysulfonyl groups are each ortho to the substituents $Q^1$ and $Q^2$.

3 Claims, No Drawings

REACTIVE DYES WITH A TRIPHENDIOXAZINE CHROMOPHORE

The present invention relates to novel triphendioxazine dyes of the formula I

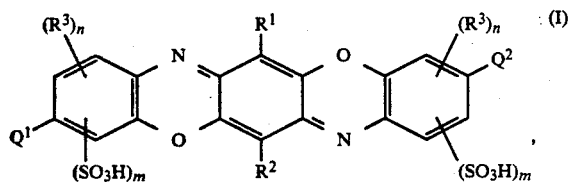

where
n is 0 or 1,
m is 1 or 2,
$R^1$ and $R^2$ are identical or different and each is independently of the other hydrogen, chlorine, bromine, hydroxysulfonyl, $C_1$-$C_4$-alkyl, $C_1$-$C_4$-alkoxy, substituted or unsubstituted phenyl or substituted or unsubstituted phenoxy,
$R^3$ is halogen, carboxyl, $C_1$-$C_4$-alkyl, $C_1$-$C_4$-alkoxy, vinylsulfonyl or the radical $-SO_2-CH_2CH_2-Z$, where Z is a leaving group, and
$Z^1$ and $Q^2$ are identical or different and each is independently of the other a radical of the formula

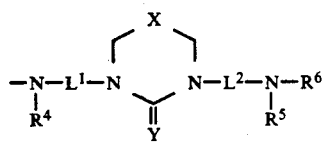

where
$R^4$ and $R^5$ are identical or different and each is independently of the other hydrogen, $C_1$-$C_4$-alkyl or phenyl,
$R^5$ is hydrogen or a fiber-reactive radical,
$L^1$ and $L^2$ are identical or different and each is independently of the other $C_2$-$C_8$-alkylene, which may be interrupted by one or more oxygen atoms in ether function or by one or more imino, $C_1$-$C_4$-alkylimino or acetylimino groups, or is phenylene,
X is a chemical bond, oxygen, sulfur, imino, $C_1$-$C_4$-alkylimino, carbonyl or methylene, and
Y is oxygen or sulfur,
with the proviso that if n is 0, $R^6$ is a fiber-reactive radical, and that the hydroxysulfonyl groups are each ortho to the substituents $Q^1$ and $Q^2$.

DE-A-2 503 611 discloses reactive dyes based on triphendioxazines. However, it has been found that these compounds still have application disadvantages.

It is an object of the present invention to make available novel reactive dyes with a triphendioxazine chromophore which have advantageous application properties.

We have found that this object is achieved by the triphendioxazine dyes of formula I defined at the beginning.

Any alkyl or alkylene appearing in the abovementioned formula I may be either straight-chain or branched.

For substituted phenyl appearing in the abovementioned formula I suitable substituents are for example $C_1$-$C_4$-alkyl, $C_1$-$C_4$-alkoxy, halogen, in particular chlorine, hydroxysulfonyl or carboxyl.

When $L^1$ and $L^2$ are each interrupted by oxygen in ether function, imino, $C_1$-$C_4$-alkylimino or acetylimino, preference is given to those radicals where this interruption occurs once or twice.

When $R^3$ is the radical $-SO_2-CH_2CH_2-Z$, Z is a leaving group. Suitable leaving groups are in particular those which are eliminable under alkaline reaction conditions, for example chlorine, $OSO_3H$, $SSO_3H$, $OP(O)(OH)_2$, $C_1$-$C_4$-alkylsulfonyloxy, substituted or unsubstituted phenylsulfonyloxy, $C_1$-$C_4$-alkanoyloxy, $C_1$-$C_4$-dialkylamino or a radical of the formula

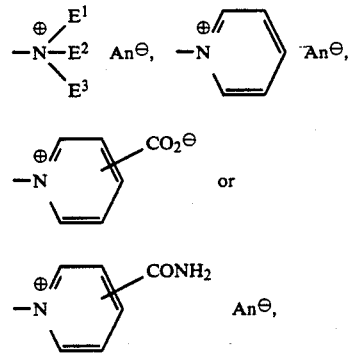

where $E^1$, $E^2$ and $E^3$ are identical or different and each is independently of the others $C_1$-$C_4$-alkyl or benzyl and an$\ominus$ is in each case an anion (eg. fluoride, chloride, bromide, iodide, mono-, di- or trichloroacetate, methylsulfonate, phenylsulfonate or tolylsulfonate).

$R^1$, $R^2$, $R^3$, $R^4$ and $R^5$ are each for example methyl, ethyl, propyl, isopropyl, butyl, isobutyl or sec-butyl.

$R^1$ and $R^2$ may each also be for example methoxy, ethoxy, propoxy, isopropoxy, butoxy, isobutoxy, sec-butoxy, phenyl, 2-, 3- or 4-methylphenyl, 2-, 3- or 4-ethylphenyl, 2-, 3- or 4-methoxyphenyl, 2-, 3- or 4-chlorophenyl, 2-, 3- or 4-hydroxysulfonylphenyl, 2-, 3- or 4-carboxyphenyl, phenoxy, 2-, 3- or 4-methylphenoxy, 2-, 3- or 4-ethylphenoxy, 2-, 3- or 4-methoxyphenoxy, 2-, 3- or 4-chlorophenoxy, 2-, 3- or 4-hydroxysulfonylphenoxy or 2-, 3- or 4-carboxyphenoxy.

$R^3$ may also be for example fluorine, chlorine, bromine, methoxy, ethoxy, propoxy, isopropoxy, butoxy, isobutoxy or sec-butoxy.

$L^1$ and $L^2$ are each for example $-(CH_2)_2-$, $-(CH_2)_3-$, $-(CH_2)_4-$, $-(CH_2)_5-$, $-(CH_2)_6-$, $-(CH_2)_7-$, $-(CH_2)_8-$, $-CH_2-CH(CH_3)-$, $-CH(CH_3)-CH(CH_3)-$, $-CH_2-CH(C_2H_5)-$, $-CH_2-CH(CH_3)-$, $-(CH_2)_2-O-(CH_2)_2-$, $-(CH_2)_2-O-(CH_2)_2-I(CH_2)_2-$, $-(CH_2)_2-NH-(CH_2)_2-$, $-(CH_2)_2-NH-(CH_2)_2-NH-(CH_2)_2-$, $-(CH_2)_2-NCH_3-(CH)_2-$, $-(CH_2)_2-NCH_3-(CH_2)_2-NCH_3-NCH_3-(CH_2)_2-$ or $-(CH_2)_2-N(COCH_3)-(CH_2)_2-$.

Fiber-reactive radicals $R^6$ are those which react with the hydroxyl groups or nitrogen-containing groups of the substrates by a substitution or addition mechanism. A substitution mechanism or the reaction of the reactive radical with the relevant groups in the substrates, for example with the hydroxyl groups of cellulose, means that the leaving groups or atoms (for example fluorine or chlorine) in the fiber-reactive radical $R^6$ are replaced by the hydroxyl groups of the cellulose in accordance with the following scheme:

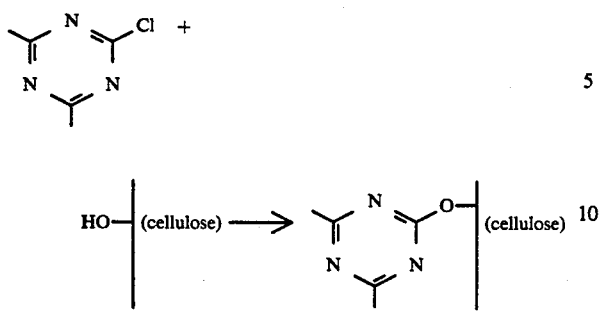

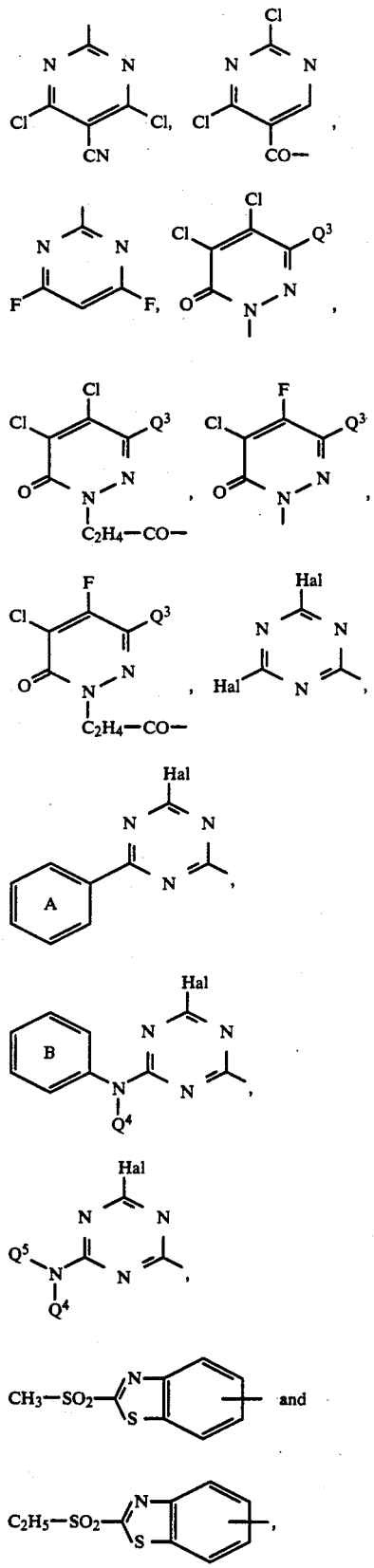

An addition mechanism for the reaction of the fiber-reactive radical with the relevant groups in the substrates, for example with the hydroxyl groups of cellulose, means that the hydroxyl groups of the cellulose are added to the fiber-reactive radical in accordance with the following scheme:

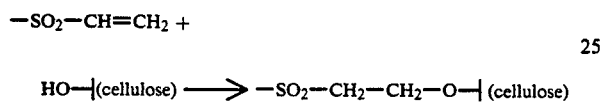

Fiber-reactive radicals $R^6$ are for example heterocyclic radicals, such as halogen-substituted radicals of 1,3,5-triazine, quinoxaline, phthalazine, pyrimidine or pyridazone, or the 2-alkylsulfonylbenzothiazole radical, or radicals of the aliphatic series.

By way of example there may be mentioned the following heterocyclic radicals:

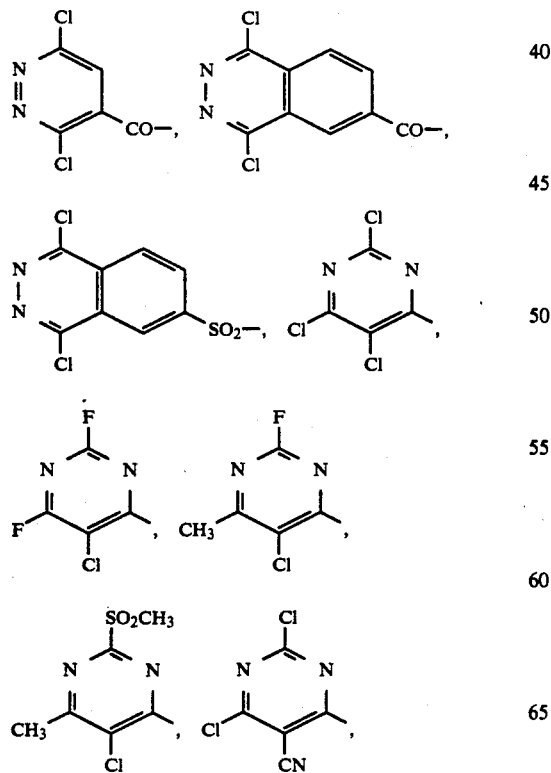

where
Hal is fluorine or chlorine,
$Q^3$ is hydrogen or nitro, $A^4$ is hydrogen or $C_1$-$C_4$-alkyl which may be substituted by sulfatosulfonyl or hydroxysulfonyl, $Q^5$ is 2-hydroxysulfonylethyl, and the rings A and B may each be monosubstituted or polysubstituted by hydroxysulfonyl and independently thereof the ring B may be monosubstituted or polysubstituted by chlorine, nitro, $C_1$-$C_4$-alkyl, $C_1$-$C_4$-alkoxy, cyano, carboxyl, acetylamino or the radical $CH_2$—$SO_2$—$CH_2CH_2$—$Z$, $SO_2CH_2CH_2$—$Z$ or $NH$-$CO$-$CH_2CH_2$—$Z$ where Z is in each case as defined above, and/or benzofused.

Radicals of the aliphatic series are for example acryloyl, mono-,di-ortrichloroacryloyl, —CO—CCl=CH—COOH, —CO—CH=CCL—COOH, 2-chloropropionyl, 3-phenylsulfonylpropionyl, 3-methylsulfonylpropionyl, 2-sulfatoethylaminosulfonyl, vinylsulfonyl, 2-chloro ethylsulfonyl, 2-sulfatoethylsulfonyl, 2-phosphatoethylsulfonyl, 2-thiosulfatoethylsulfonyl, 2-methylsulfonylethylsulfonyl, 2-phenylsulfonylethylsulfonyl, 2-fluoro-2-chloro-3,3-difluorocyclobut-1-yl-carbonyl, 2,2,3,3-tetrafluorocyclobut-1-yl-carbonyl, 2,2,3,3-tetrafluorocyclobut-1-ylsulfonyl, 2—(2,2,3,3-tetrafluorocyclobut-1-yl)acryloyl, 1- or 2-bromoacryloyl, 1- or 2-alkyl- or -aryl-sulfonylacryloyl, such as 1- or 2-methylsulfonylacryloyl, 1,2-dichloropropionyl or 1,2-dibromopropionyl.

Preference is given to triphendioxazine dyes of the formula I where n is 0 or 1, m is 1 or 2, $R^1$ and $R^2$ are each independently of the other hydrogen, chlorine, bromine, hydroxysulfonyl, $C_1$-$C_4$-alkyl, $C_1$-$C_4$-alkoxy, phenyl or phenoxy, $R^3$ is halogen, $C_1$-$C_4$-alkyl, $C_1$-$C_4$-alkoxy, vinylsulfonyl or the radical —$SO_2$—$CH_2CH_2$—$Z$, where Z is as defined above, $R^4$ and $R^5$ are each independently of the other hydrogen, $C_1$-$C_4$-alkyl or phenyl, $R^6$ is hydrogen or a fiber-reactive radical based on halogen-substituted 1,3,5-triazine, quinoxaline, phthalazine, pyrimidine or pyridazone, $L^1$ and $L^2$ are each independently of the other $C_2$-$C_6$-alkylene or phenylene, X is a chemical bond, oxygen, imino or methylene, and Y is oxygen.

Preference is further given to triphendioxazine dyes of the formula I where $L^1$ and $L^2$ are each independently of the other $C_2$-$C_8$-alkylene.

Particular preference is given to triphendioxazine dyes of the formula I where n is 0 or 1, m is 1 or 2, $R^1$ and $R^2$ are each independently of the other hydrogen, chlorine, or hydroxysulfonyl, $R^3$ is chlorine, bromine or hydroxysulfonyl, $R^4$ and $R^5$ are each independently of the other hydrogen or $C_1$-$C_4$-alkyl, $R^6$ is a fiber-reactive radical based on halogen-substituted 1,3,5-triazine, $L^1$ and $L^2$ are each independently of the other $C_2$-$C_6$-alkylene, X is a chemical bond, oxygen or methylene, and Y is oxygen.

Particular preference is further given to triphendioxazine dyes of the formula I where $R^6$ is a fiber-reactive radical of the monochloro- or monofluorotriazine series.

Of special interest are triphendioxazine dyes of the formula I where n is 0, m is 1, $R^1$ and $R^2$ are each independently of the other hydrogen or chlorine, $R^4$ and $R^5$ are each independently of the other hydrogen or $C_1$-$C_4$-alkyl, $R^6$ is a fiber-reactive radical of the monochloro- or monofluoro-triazine series, $L^1$ and $L^2$ are each independently of the other $C_2$-$C_4$-alkylene, X is a chemical bond or methylene, and Y is oxygen.

The novel triphendioxazine dyes of the formula I are obtainable in a conventional manner.

For instance, the triphendioxazine dyes of the formula I where $R^6$ is a fiber-reactive radical can be obtained from those triphendioxazine dyes of the formula I where $R^6$ is hydrogen by condensation with a fiber-reactive group component of the formula II $$R^7\text{-Hal} \qquad (II),$$

where Hal is halogen and $R^7$ is a fiber-reactive radical.

This condensation can in general be carried out, depending on the fiber-reactive group component II used, either in an aqueous or in an aqueous-organic medium at from 0° to 80° C. and at a pH of 3–9 in the presence of an alkali condensing agent, such as aqueous alkali metal bicarbonate, alkali metal carbonate, alkali metal hydroxide, alkali metal hydrogen phosphate, dialkali metal hydrogen phosphate or trialkali metal phosphate solution.

Suitable organic solvents are for example acetone, ethanol, propanol, isopropanol, butanol, N-methylpyrrolidinone and N,N-dimethylformamide.

Those triphendioxazine dyes of the formula I where $R^6$ is hydrogen are obtainable in a conventional manner from the dianilides of the formula III

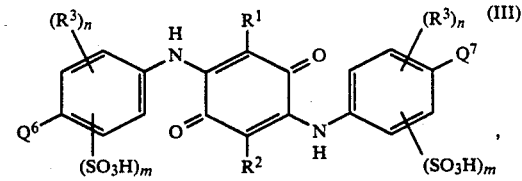

where m, n, $R^1$, $R^2$ and $R^3$ are each as defined above and $Q^6$ and $Q^7$ are identical or different and each is independently of the other the radical

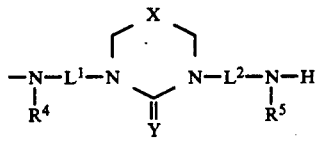

where $R^4$, $R^5$, $L^1$, $L^2$, X and Y are each as defined above, by ring closure using condensing agents, such as sulfuric acid or oleum (DE-A-2 503 611), possibly in the presence of suitable oxidizing agents, eg. manganese dioxide (EP-A-199 056), sodium peroxodisulfate, potassium peroxodisulfate or ammonium peroxodisulfate (GB-A-1 589 915), chlorine, bromine or inorganic bromine compounds (EP-A-296 411), iodine or inorganic iodine compounds (USDA-4 532 323), catalytic amounts of organic iodine compounds (EP-A-311 969) or sodium perborate or sodium percarbonate (earlier patent application EP-A-400 429).

The dianilides III are prepared in a conventional manner by condensing the benzoquinones of the formula IV

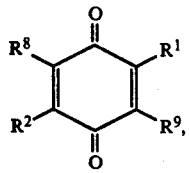

where $R^1$ and $R^2$ are each as defined above and $R^8$ and $R^9$ are identical or different and each is independently of the other chlorine, bromine, $C_1$-$C_4$-alkoxy or phenoxy, with amines of the formula V

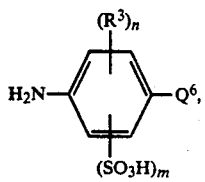

where m, n, $R^3$ and $Q^6$ are each as defined above.

The condensation of the benzoquinones IV with the amines V is in general carried out in an aqueous or aqueous-organic medium in the presence of an alkaline condensing agent at pH 3–11, preferably pH 4–8, and 20°–90° C., preferably 40°–70° C., or in buffered solutions which contain the above alkaline condensing agents. It is also possible to use a purely organic medium containing acid-binding agents.

Alkaline condensing agents are for example sodium bicarbonate, sodium carbonate, sodium acetate, potassium acetate, sodium hydroxide, potassium hydroxide, sodium phosphates and sodium borate.

Suitable organic solvents are for example those mentioned above.

Another method of preparation consists in the addition of the amines V to 1,4-benzoquinones of the formula (VI)

(VI)

where $R^1$ and $R^2$ are each as defined above, and the oxidation of the adduct intermediates.

The amines V in turn can be obtained for example by condensing the halobenzenes of the formula VII

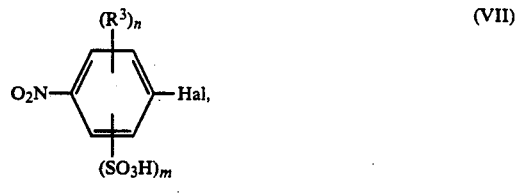

where m, n and $R^3$ are each as defined above and Hal is halogen, in particular chlorine or bromine, with the diamines of the formula VIII $$Q^6\text{-H} \qquad (VIII),$$

where $Q^6$ is as defined above, and subsequently reducing the nitro group.

The triphendioxazine dyes of the formula I according to the present invention are suitable in an advantageous manner for dyeing or printing hydroxyl- or amido-containing materials, such as textile fibers, yarns or fabrics made of wool, silk or synthetic polyamide or polyurethane fibers, or for producing wash-fast dyeings or prints on natural or regenerated cellulose, in which case the cellulose materials are advantageously treated in the presence of acid-binding agents with or without heat in the manner known for reactive dyes.

The novel dyes have good light and wet fastness properties.

The indicated formulae are those of the free acids. In general, the dyes are prepared and also used in the form of their salts, in particular the lithium, sodium or potassium salts.

The non-reactive dyes are used with preference for preparing the reactive dyes.

The following Examples will further illustrate the invention:

EXAMPLE 1

(a) Reactive dye 27.4 g of the compound of the formula were stirred into 1,100 ml of water at pH 10, set with sodium hydroxide.

This solution was added dropwise to a solution of the condensation product of 20.0 g of cyanuric chloride and 15.6 g of 1-aminobenzene-3-sulfonic acid at 40°–50° C. stirred at 40°–50° C. until the reaction had ended, which took about 1 hour. After the mixture had been cooled down to room temperature, the dye was salted out with 300 g of sodium chloride, filtered off with suction and dried at 50°–60° C. under reduced pressure. Grinding produced a blue dye powder which produces brilliant blue dyeings on cotton having good fastness properties ($\lambda_{max}$: 642 nm).

The dye conforms to the formula

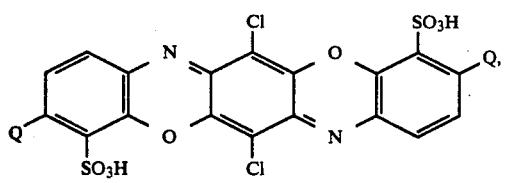

where each Q is the radical

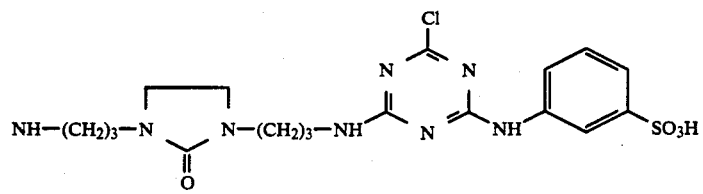

(b) Starting material 237.5 g of 5-nitro-2-chlorobenzenesulfonic acid were stirred into 3,000 ml of water at pH 7 set with 10-% strength by weight sodium hydroxide solution. The resultant solution was added dropwise at 95° C. to a solution of 400 g of 1,3-bis(3-aminopropyl)imidazolidin-2-one in 100 ml of water over 90 minutes. Stirring was continued at 95° C. until the reaction had ended, which took about 6 hours.

After the mixture had cooled down to room temperature, it was adjusted to pH 7 with concentrated hydrochloric acid and subsequently stirred for 1 hour. The precipitated product was filtered off with suction, washed with cold water and dried at 50°-60° C. under reduced pressure.

The yellow compound conforms to the following structure:

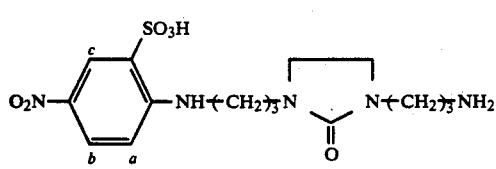

$^1$H-NMR (DMS, δ, ppm): 1.75 (m, CH$_2$) 2.75 (t, CH$_2$), 3.10 (m, 2 CH$_2$), 3.30 (m, 3 CH$_2$), 6.70 (d, arom. H$^a$), 7.40 (brs, NH), 7.60 (brs, NH$_2$), 8.00 (d, arom. H$^b$), 8.30 (d, arom. H$^c$).

171.5 g of the nitro compound thus obtained were hydrogenated in 2,000 ml of methanol and 500 ml of water at room temperature with hydrogen in the presence of a catalyst (palladium on carbon). The catalyst was filtered off, and the filtrate was evaporated to dryness. This left 152 g of a yellow compound conforming to the following structure:

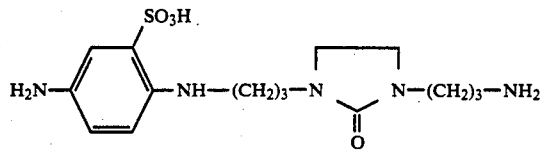

$^1$H-NMR (DMSO, δ, ppm): 1.70 (m, 2 CH$_2$), 2.75 (t, CH$_2$), 3.15 (m, 5 CH$_2$), 3.30 (brs, NH$_2$), 6.30 (brs, arom. H), 6.15 (brs, arom. H), 6.90 brs, arom. H), 5.0–7.0 (brs, NH, NH$_2$). 143.4 g of the amine obtained were dissolved in 1,800 ml of water at pH 5.5 set with hydrochloric acid. After 50.4 g -of chloranil had been added, the mixture was heated to 90°-95° C. at pH 5.5 maintained with 5% strength by weight sodium bicarbonate solution and stirred at that temperature for 2 hours while the pH was maintained at 5.5 by the dropwise addition of 5% strength by weight sodium bicarbonate solution. After the condensation had ended, the dark brown reaction product was filtered off with suction in the heat, and the residue was washed with water. The dianilide obtained conforms to the formula

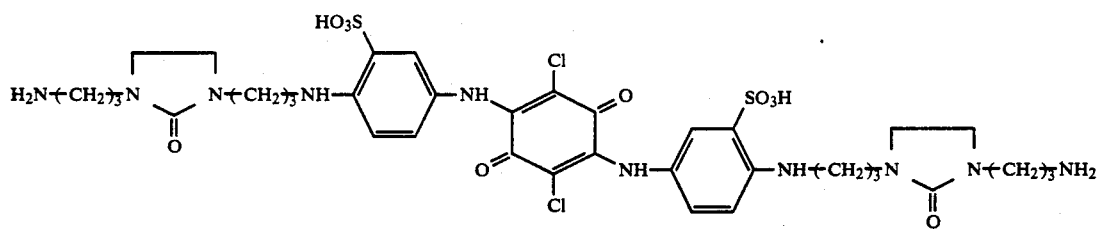

140.2 g of this dianilide were added with thorough stirring at 020 -5° C. to a mixture of 842.6 g of 96% strength by weight sulfuric acid and 766 g of 24% strength by weight oleum. The mixture was subsequently stirred at 0°-5° C. for 3 hours and then warmed to 20°-25° C. At that temperature 97.9 g of potassium peroxodisulfate were added a little at a time. The mixture was then stirred at 20°-25° C. for 1 hour and thereafter discharged onto 3,060 g of ice-water at 0°-10° C. 10% strength by weight sodium hydroxide solution was added to adjust the pH to 7, and the paste was filtered off with suction and washed with water. The resulting dye conforms to the formula

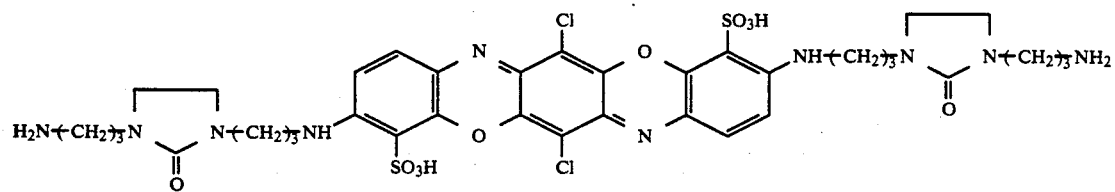

($\lambda_{max}$: 587 nm).

The same method was used to obtain further dyes by reacting the triphendioxazine of the formula

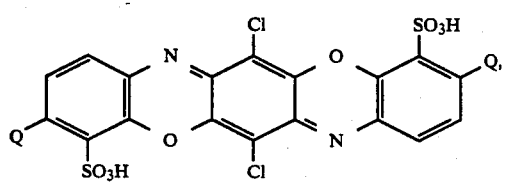

where each Q is the radical

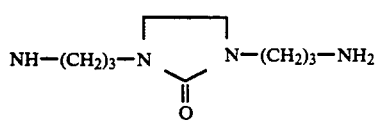

with the reaction product of cyanuric chloride and the amines listed below in Table No. 1.

TABLE 1

| Example No. | Amine |
|---|---|
| 2 | Aniline-2,5-disulfonic acid |
| 3 | Aniline-2,4-disulfonic acid |
| 4 | m-Sulfanilic acid |
| 5 | p-Sulfanilic acid |
| 6 | 2-Aminotoluene-5-sulfonic acid |
| 7 | 2-Aminotoluene-4-sulfonic acid |
| 8 | 2-Aminoanisole-5-sulfonic acid |
| 9 | 2-Aminoanisole-4-sulfonic acid |
| 10 | 4-Aminoanisole-4-sulfonic acid |
| 11 | 4-Aminoanisole-2-sulfonic acid |
| 12 | 2-Amino-1-chlorobenzene-4-sulfonic acid |
| 13 | 2-Amino-1-chlorobenzene-5-sulfonic acid |
| 14 | 2-Aminoaphthalene-1,5-disulfonic acid |
| 15 | 1-Aminoaphthalene-4,7-disulfonic acid |
| 16 | 4-Aminoanisole-2,5-disulfonic acid |
| 17 | 4-Aminotoluene-2,5-disulfonic acid |
| 18 | 2-Aminoethanesulfonic acid |
| 19 | Amidosulfuric acid |
| 20 | N-Ethylaniline-3-sulfonic acid |
| 21 | N-(2-Sulfatoethyl)aniline |
| 22 | N-Methylaniline-3-sulfonic acid |
| 23 | H₂N—C₆H₄—SO₂—(CH₂)₂—OSO₃H |
| 24 | [structure: HO₃S-, HN-CH₃, NHC(O)-(CH₂)₂-Cl benzene] |
| 25 | [structure: H₂N-, HO₃S-benzene-NHC(O)—(CH₂)₂—OSO₃H] |
| 26 | [structure: H₂N-, HO₃S-benzene-NHC(O)—(CH₂)₂—SO₃H] |
| 27 | [structure: H₂N-, Cl-benzene-CH₂SO₂—(CH₂)₂—OSO₃H] |
| 28 | [structure: H₂N-benzene with CH₂SO₂—(CH₂)₂—OSO₃H and SO₂—(CH₂)₂—OSO₃H] |
| 29 | [structure: H₂N-benzene with CH₂SO₃H and SO₂—(CH₂)₂—Cl] |
| 30 | [structure: H₂N-, HO₃S-benzene with SO₃H and NHC(O)—(CH₂)₂—Cl] |
| 31 | [structure: H₂N-, HO₃S-benzene with SO₃H and NHC(O)—(CH₂)₂—Cl] |

Dyes having similar properties are obtained on reacting the dyes (A) to (E) mentioned below in Table 2 with the reaction product of cyanuric chloride and the amines of Examples 1 to 31 as described in Example 1. The dyes are listed in Table 3.

TABLE 2

Dye:

structure with R¹, R², Q substituents on the trioxazine core with two SO₃H groups

| Dye | R¹ | R² | Q |
|-----|-----|-----|---|
| A | Cl | Cl | NH–(CH₂)₂–N⌐⌐N–(CH₂)₂–NH₂ (piperazine-2-one linker, ethylene bridges) |
| B | Cl | Cl | NH–(CH₂)₂–N⌐⌐N–(CH₂)₂–NH₂ (with propylene bridge in ring) |
| C | Br | Br | NH–(CH₂)₃–N⌐⌐N–(CH₂)₃–NH₂ |
| D | CH₃ | CH₃ | NH–(CH₂)₃–N⌐⌐N–(CH₂)₃–NH₂ |
| E | OCH₃ | OCH₃ | NH–(CH₂)₃–N⌐⌐N–(CH₂)₃–NH₂ |

TABLE 3

| Example No. | Amine | Dye |
|---|---|---|
| 32 | Aminobenzene-3-sulfonic acid | A |
| 33 | Aniline-2,5-disulfonic acid | A |
| 34 | Aniline-2,5-disulfonic acid | A |
| 35 | m-Sulfanilic acid | A |
| 36 | p-Sulfanilic acid | A |
| 37 | 2-Aminotoluene-5-sulfonic acid | A |
| 38 | 2-Aminotoluene-4-sulfonic acid | A |
| 39 | 2-Aminoanisole-5-sulfonic acid | A |
| 40 | 2-Aminoanisole-4-sulfonic acid | A |
| 41 | 4-Aminoanisole-3-sulfonic acid | A |
| 42 | 4-Aminoanisole-2-sulfonic acid | A |
| 43 | 2-Amino-1-chlorobenzene-4-sulfonic acid | A |
| 44 | 2-Amino-1-chlorobenzene-5-sulfonic acid | A |
| 45 | 2-Aminonaphthalene-1,5-disulfonic acid | A |
| 46 | 1-Aminonaphthalene-4,7-disulfonic acid | A |
| 47 | 4-Aminoanisole-2,5-disulfonic acid | A |
| 48 | 4-Aminotoluene-2,5-disulfonic acid | A |
| 49 | 2-Aminoethanesulfonic acid | A |
| 50 | Amidosulfuric acid | A |
| 51 | N-Ethylaniline-3-sulfonic acid | A |
| 52 | N-(2-Sulfatoethyl)aniline | A |
| 53 | N-Methylaniline-3-sulfonic acid | A |
| 54 | H₂N–C₆H₄–SO₂–(CH₂)₂–OSO₃H | A |
| 55 | 4-HO₃S, 3-NHCH₃ aniline with NHC(O)–(CH₂)₂–Cl substituent | A |
| 56 | 5-H₂N, 2-SO₃H, 4-HO₃S benzene with NHC(O)–(CH₂)₂–Cl | A |
| 57 | 3-H₂N, 4-HO₃S-phenyl–NHC(O)–(CH₂)₂–OSO₃H | A |
| 58 | 3-H₂N, 4-HO₃S-phenyl–NHC(O)–(CH₂)₂–SO₃H | A |
| 59 | 5-H₂N, 2-Cl-phenyl–CH₂SO₂–(CH₂)₂–OSO₃H | A |
| 60 | 4-H₂N-phenyl with CH₂SO₂–(CH₂)₂–OSO₃H and SO₂–(CH₂)₂–OSO₃H | A |
| 61 | 4-H₂N-phenyl with CH₂SO₃H and SO₂–(CH₂)₂–Cl | A |
| 62 | 5-H₂N, 2-SO₃H, 4-HO₃S-phenyl–NHC(O)–(CH₂)₂–Cl | A |
| 63 | Aminobenzene-3-sulfonic acid | B |

TABLE 3-continued

| Example No. | Amine | Dye |
|---|---|---|
| 64 | Aniline-2,5-disulfonic acid | B |
| 65 | Aniline-2,4-disulfonic acid | B |
| 66 | m-Sulfanilic acid | B |
| 67 | p-Sulfanilic acid | B |
| 68 | 2-Aminotoluene-5-sulfonic acid | B |
| 69 | 2-Aminotoluene-4-sulfonic acid | B |
| 70 | 2-Aminoanisole-5-sulfonic acid | B |
| 71 | 2-Aminoanisole-4-sulfonic acid | B |
| 72 | 4-Aminoanisole-3-sulfonic acid | B |
| 73 | 4-Aminoanisole-2-sulfonic acid | B |
| 74 | 2-Amino-1-chlorobenzene-4-sulfonic acid | B |
| 75 | 2-Amino-1-chlorobenzene-5-sulfonic acid | B |
| 76 | 2-Aminonaphthalene-1,5-disulfonic acid | B |
| 77 | 1-Aminonaphthalene-4,7-disulfonic acid | B |
| 78 | 4-Aminoanisole-2,5-disulfonic acid | B |
| 79 | 4-Aminotoluene-2,5-disulfonic acid | B |
| 80 | 2-Aminoethanesulfonic acid | B |
| 81 | Amidosulfuric acid | B |
| 82 | N-Ethylaniline-3-sulfonic acid | B |
| 83 | N-(2-Sulfatoethyl)aniline | B |
| 84 | N-Methylaniline-3-sulfonic acid | B |
| 85 | H₂N—C₆H₄—SO₂—(CH₂)₂—OSO₃H | B |
| 86 | HO₃S-substituted aniline with HN—CH₃ and NHC(O)—(CH₂)₂—Cl | B |
| 87 | H₂N, SO₃H, HO₃S-substituted benzene with NHC(O)—(CH₂)₂—Cl | B |
| 88 | H₂N, HO₃S-substituted benzene with NHC(O)—(CH₂)₂—OSO₃H | B |
| 89 | H₂N, HO₃S-substituted benzene with NHC(O)—(CH₂)₂—SO₃H | B |
| 90 | H₂N, Cl-substituted benzene with CH₂SO₂—(CH₂)₂—OSO₃H | B |
| 91 | H₂N-substituted benzene with CH₂SO₂—(CH₂)₂—OSO₃H and SO₂—(CH₂)₂—OSO₃H | B |
| 92 | H₂N-substituted benzene with CH₂SO₃H and SO₂—(CH₂)₂—Cl | B |
| 93 | H₂N, SO₃H, HO₃S-substituted benzene with NHC(O)—(CH₂)₂—Cl | B |
| 94 | Aminobenzene-3-sulfonic acid | C |
| 95 | Aniline-2,5-disulfonic acid | C |
| 96 | Aniline-2,4-disulfonic acid | C |
| 97 | m-Sulfanilic acid | C |
| 98 | p-Sulfanilic acid | C |
| 99 | 2-Aminotoluene-5-sulfonic acid | C |
| 100 | 2-Aminotoluene-4-sulfonic acid | C |
| 101 | 2-Aminoanisole-5-sulfonic acid | C |
| 102 | 2-Aminoanisole-4-sulfonic acid | C |
| 103 | 4-Aminoanisole-3-sulfonic acid | C |
| 104 | 4-Aminoanisole-2-sulfonic acid | C |
| 105 | 2-Amino-1-chlorobenzene-4-sulfonic acid | C |
| 106 | 2-Amino-1-chlorobenzene-5-sulfonic acid | C |
| 107 | 2-Aminonaphthalene-1,5-disulfonic acid | C |
| 108 | 1-Aminonaphthalene-4,7-disulfonic acid | C |
| 109 | 4-Aminoanisole-2,5-disulfonic acid | C |
| 110 | 4-Aminotoluene-2,5-disulfonic acid | C |
| 111 | 2-Aminoethanesulfonic acid | C |
| 112 | Amidosulfuric acid | C |
| 113 | N-Ethylaniline-3-sulfonic acid | C |
| 114 | N-(2-Sulfatoethyl)aniline | C |
| 115 | N-Methylaniline-3-sulfonic acid | C |
| 116 | H₂N—C₆H₄—SO₂—(CH₂)₂—OSO₃H | C |
| 117 | HO₃S-substituted aniline with HN—CH₃ and NHC(O)—(CH₂)₂—Cl | C |
| 118 | H₂N, SO₃H, HO₃S-substituted benzene with NHC(O)—(CH₂)₂—Cl | C |

TABLE 3-continued

| Example No. | Amine | Dye |
|---|---|---|
| 119 | 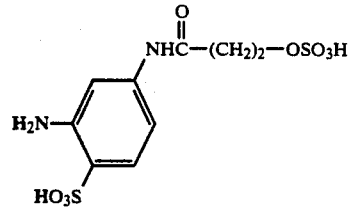 3-amino-4-sulfo-phenyl with NHC(O)(CH2)2—OSO3H | C |
| 120 | 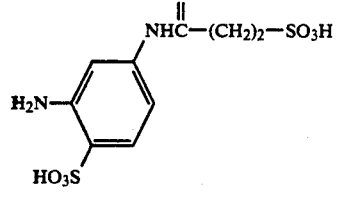 3-amino-4-sulfo-phenyl with NHC(O)(CH2)2—SO3H | C |
| 121 | 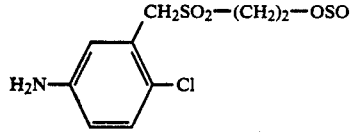 5-amino-2-chloro-phenyl with CH2SO2—(CH2)2—OSO3H | C |
| 122 | 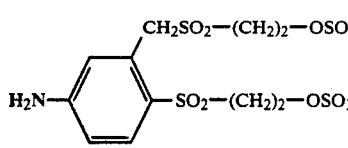 4-amino-phenyl with CH2SO2—(CH2)2—OSO3H and SO2—(CH2)2—OSO3H | C |
| 123 | 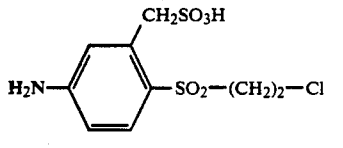 4-amino-phenyl with CH2SO3H and SO2—(CH2)2—Cl | C |
| 124 | 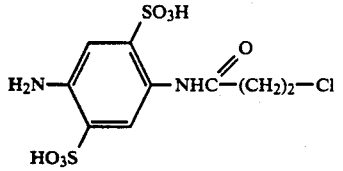 4-amino-2,5-disulfo-phenyl with NHC(O)(CH2)2—Cl | C |
| 125 | Aminobenzene-3-sulfonic acid | D |
| 126 | Aniline-2,5-disulfonic acid | D |
| 127 | Aniline-2,4-disulfonic acid | D |
| 128 | m-Sulfanilic acid | D |
| 129 | p-Sulfanilic acid | D |
| 130 | 2-Aminotoluene-5-sulfonic acid | D |
| 131 | 2-Aminotoluene-4-sulfonic acid | D |
| 132 | 2-Aminoanisole-5-sulfonic acid | D |
| 133 | 2-Aminoanisole-4-sulfonic acid | D |
| 134 | 4-Aminoanisole-3-sulfonic acid | D |
| 135 | 4-Aminoanisole-2-sulfonic acid | D |
| 136 | 2-Amino-1-chlorobenzene-4-sulfonic acid | D |
| 137 | 2-Amino-1-chlorobenzene-5-sulfonic acid | D |
| 138 | 2-Aminonapthalene-1,5-disulfonic acid | D |
| 139 | 1-Aminonaphtalene-4,7-disulfonic acid | D |
| 140 | 4-Aminoanisole-2,5-disulfonic acid | D |
| 141 | 4-Aminotoluene-2,5-disulfonic acid | D |
| 142 | 2-Aminoethanesulfonic acid | D |
| 143 | Amidosulfuric acid | D |
| 144 | N-Ethylaniline-3-sulfonic acid | D |
| 145 | N-(2-Sulfatoethyl)aniline | D |
| 146 | N-Methylaniline-3-sulfonic acid | D |
| 147 | 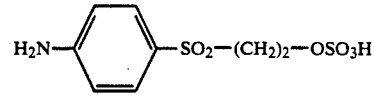 4-amino-phenyl with SO2—(CH2)2—OSO3H | D |
| 148 | 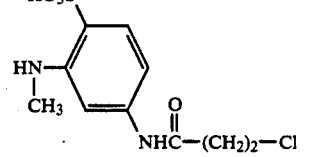 4-sulfo-3-(N-methylamino)-phenyl with NHC(O)(CH2)2—Cl | D |
| 149 | 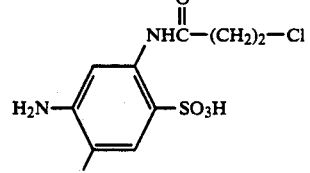 5-amino-4-sulfo-2-sulfo-phenyl with NHC(O)(CH2)2—Cl | D |
| 150 | 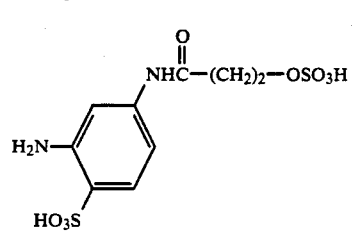 3-amino-4-sulfo-phenyl with NHC(O)(CH2)2—OSO3H | D |
| 151 | 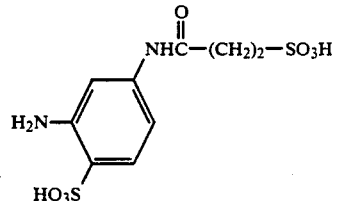 3-amino-4-sulfo-phenyl with NHC(O)(CH2)2—SO3H | D |
| 152 | 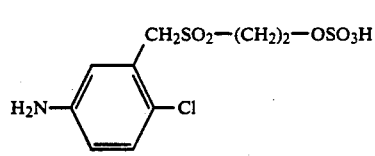 5-amino-2-chloro-phenyl with CH2SO2—(CH2)2—OSO3H | D |
| 153 | 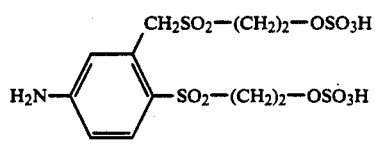 4-amino-phenyl with CH2SO2—(CH2)2—OSO3H and SO2—(CH2)2—OSO3H | D |
| 154 | 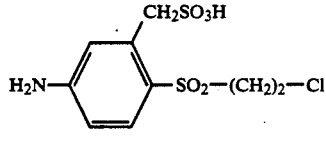 4-amino-phenyl with CH2SO3H and SO2—(CH2)2—Cl | D |
| 155 | 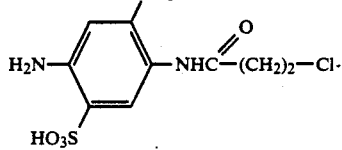 4-amino-2,5-disulfo-phenyl with NHC(O)(CH2)2—Cl | D |
| 156 | Aminobenzene-3-sulfonic acid | E |

TABLE 3-continued

| Example No. | Amine | Dye |
|---|---|---|
| 157 | Aniline-2,5-disulfonic acid | E |
| 158 | Aniline-2,4-disulfonic acid | E |
| 159 | m-Sulfanilic acid | E |
| 160 | p-Sulfanilic acid | E |
| 161 | 2-Aminotoluene-5-sulfonic acid | E |
| 162 | 2-Aminotoluene-4-sulfonic acid | E |
| 163 | 2-Aminoanisole-5-sulfonic acid | E |
| 164 | 2-Aminoanisole-4-sulfonic acid | E |
| 165 | 4-Aminoanisole-3-sulfonic acid | E |
| 166 | 4-Aminoanisole-2-sulfonic acid | E |
| 167 | 2-Amino-1-chlorobenzene-4-sulfonic acid | E |
| 168 | 2-Amino-1-chlorobenzene-5-sulfonic acid | E |
| 169 | 2-Aminonaphthalene-1,5-disulfonic acid | E |
| 170 | 1-Aminonaphthalene-4,7-disulfonic acid | E |
| 171 | 4-Aminoanisole-2,5-disulfonic acid | E |
| 172 | 4-Aminotoluene-2,5-disulfonic acid | E |
| 173 | 2-Aminoethanesulfonic acid | E |
| 174 | Amidosulfuric acid | E |
| 175 | N-Ethylaniline-3-sulfonic acid | E |
| 176 | N-(2-Sulfatoethyl)aniline | E |
| 177 | N-Methylaniline-3-sulfonic acid | E |
| 178 | H₂N—C₆H₄—SO₂—(CH₂)₂—OSO₃H | E |
| 179 | (structure with HO₃S, HN-CH₃, NHC(O)—(CH₂)₂—Cl) | E |
| 180 | (structure with H₂N, HO₃S, SO₃H, NHC(O)—(CH₂)₂—Cl) | E |
| 181 | (structure with H₂N, HO₃S, NHC(O)—(CH₂)₂—OSO₃H) | E |
| 182 | (structure with H₂N, HO₃S, NHC(O)—(CH₂)₂—SO₃H) | E |
| 183 | (structure with H₂N, Cl, CH₂SO₂—(CH₂)₂—OSO₃H) | E |
| 184 | (structure with H₂N, CH₂SO₂—(CH₂)₂—OSO₃H, SO₂—(CH₂)₂—OSO₃H) | E |
| 185 | (structure with H₂N, CH₂SO₃H, SO₂—(CH₂)₂—Cl) | E |
| 186 | (structure with H₂N, SO₃H, HO₃S, NHC(O)—(CH₂)₂—Cl) | E |

We claim:

1. A triphendioxazine dye of the formula I

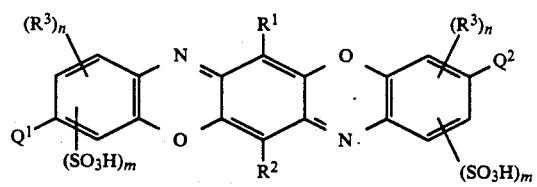

where
n is 0 or 1,
m is 1 or 2,
$R^1$ and $R^2$ are identical or different and each is independently of the other hydrogen, chlorine, bromine, hydroxysulfonyl, $C_1$–$C_4$-alkyl, $C_1$–$C_4$-alkoxy, phenyl or phenoxy, wherein phenyl or phenoxy may be substituted by a substituent selected from the group consisting of $C_1$–$C_4$-alkyl, $C_1$–$C_4$-alkoxy, halogen, hydroxysulfonyl, and carboxy,
$R^3$ is halogen, carboxyl, $C_1$–$C_4$-alkyl, $C_1$–$C_4$-alkoxy, vinylsulfonyl or the radical —SO₂—CH₂CH₂—Z, where Z is a leaving group selected from the group consisting of Cl, OSO₃H, SSO₃H, OP(O)(OH)₂, $C_1$–$C_4$-alkylsulfonyloxy, substituted or unsubstituted phenylsulfonyloxy, $C_1$–$C_4$-alkanoyloxy, $C_1$–$C_4$-dialkylamino and radicals of formulas (i)–(iv)

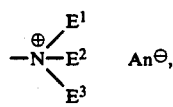  (i)

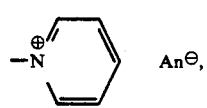  (ii)

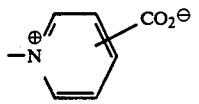

or

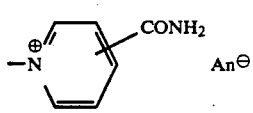

where $E^1$, $R^2$ and $R^3$ are identical or different and each is independently of the others $C_1$–$C_4$-alkyl or benzyl and An is an anion selected from the group consisting of halogen, mono- di- or trichloroacetate, methylsulfonate, phenylsulfonate and tolylsulfonate, and $Q^1$ and $Q^2$ are identical or different and each is independently of the other a radical of the formula

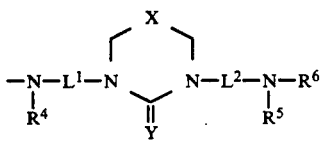

where $R^4$ and $R^5$ are identical or different and each is independently of the other hydrogen, $C_1$–$C_4$-alkyl or phenyl, $R^6$ is hydrogen or a fiber-reactive radical selected from the group consisting of aliphatic hydrocarbons, halogen-substituted 1,3,5-triazine, halogen-substituted quinoxaline, halogen substituted phthalazine, halogen substituted pyrimidine, halogen substituted pyridazone, and 2-alkysulfonyl benzothiazole, $L^1$ and $L^2$ are identical or different and each is independently of the other $C_2$–$C_8$-alkylene, which may be interrupted by one or more oxygen atoms in ether function or by one or more imino, $C_1$–$C_4$-alkylimino or acetylimino groups, or is phenylene, X is a chemical bond, oxygen, sulfur, imino, $C_1$–$C_4$-alkylimino, carbonyl or methylene, and Y is oxygen or sulfur, with the proviso that if n is 0, $R^6$ is a fiber-reactive radical, and that the hydroxysulfonyl groups are each ortho to the substituents $Q^1$ and $Q^2$.

2. A triphendioxazine dye as claimed in claim 1, wherein n is 0 or 1, m is 1 or 2, $R^1$ and $R^2$ are each independently of the other hydrogen chlorine, bromine, hydroxysulfonyl, $C_1$–$C_4$-alkyl, $C_1$–$C_4$-alkoxy, phenyl or phenoxy, $R^3$ is halogen, $C_1$–$C_4$-alkyl, $C_1$–$C_4$-alkoxy, vinylsulfonyl or the radical —$SO_2$—$CH_2CH_2$—Z, where Z is as defined in claim 1, $R^4$ and $R^5$ are each independently of the other hydrogen, C–$C_4$-alkyl or phenyl, $R^6$ is hydrogen or a fiber-reactive radical selected from the group consisting of halogen-substituted 1,3,5-triazine, halogen-substituted quinoxaline, halogen substituted phthalazine, halogen substituted pyrimidine and halogen substituted pyridazone, $L^1$ and $L^2$ are each independently of the other $C_2$–$C_8$-alkylene or phenylene, X is a chemical bond, oxygen, imino or methylene, and Y is oxygen.

3. A triphendioxazine dye as claimed in claim 1, wherein n is 0 or 1, m is 1 or 2, $R^1$ and $R^2$ are each independently of the other hydrogen, chlorine, or hydroxysulfonyl, $R^3$ is chlorine, bromine or hydroxysulfonyl, $R^4$ and $R^5$ are each independently of the other hydrogen or $C_1$–$C_4$-alkyl, $R^6$ is halogen-substituted 1,3,5-triazine, $L^1$ and $L^3$ are each independently of the other $C_214$ $C_8$ alkylene, X is a chemical bond, oxygen or methylene, and Y is oxygen.

* * * * *